United States Patent [19]

Harvey

[11] 4,142,232

[45] Feb. 27, 1979

[54] STUDENT'S COMPUTER

[76] Inventor: Norman L. Harvey, 127 Beverly Dr., SE, Winter Haven, Fla. 33880

[21] Appl. No.: 642,239

[22] Filed: Dec. 18, 1975

Related U.S. Application Data

[63] Continuation-in-part of Ser. No. 375,455, Jul. 2, 1973.

[51] Int. Cl.² .................. G06F 13/04; G06F 7/28; G11B 31/00; G11C 17/00
[52] U.S. Cl. .................................. 364/200; 360/72; 179/100.4 D
[58] Field of Search .............. 445/1; 340/172.5; 178/6.6 DD; 364/200, 900; 179/100.4 D; 360/72; 318/568; 214/1 CM

[56] References Cited

U.S. PATENT DOCUMENTS

| | | | |
|---|---|---|---|
| 3,387,279 | 6/1968 | Bailey | 340/172.5 |
| 3,585,600 | 6/1971 | Saltini | 340/172.5 |
| 3,593,299 | 7/1971 | Driscoll et al. | 340/172.5 |
| 3,661,397 | 5/1972 | Worth et al. | 179/100.4 D X |
| 3,662,339 | 5/1972 | Tyler et al. | 340/146.2 |
| 3,662,350 | 5/1972 | Chertok | 179/100.4 D X |
| 3,662,363 | 5/1972 | Chertok | 179/100.4 D X |
| 3,691,531 | 9/1972 | Saltini et al. | 340/172.5 |
| 3,701,846 | 10/1972 | Zenzefilis | 178/6.6 DD |
| 3,704,363 | 11/1972 | Salmassy et al. | 340/172.5 |
| 3,711,641 | 1/1973 | Palmer | 340/174.1 B |
| 3,732,546 | 5/1973 | Ronkin et al. | 340/172.5 |
| 3,755,792 | 8/1973 | Harvey | 340/173 TP |
| 3,842,405 | 10/1974 | Key et al. | 340/172.5 |
| 3,931,457 | 1/1976 | Mes | 360/72 X |
| 3,937,903 | 2/1976 | Osann | 360/72 X |

Primary Examiner—Gareth D. Shaw
Assistant Examiner—Jan E. Rhoads

[57] ABSTRACT

This disclosure describes a novel computer system in which a large capacity, serial storage medium, on which standardized programs and data banks can be economically recorded, as the primary memory component. The operating software program is not transferred into core memory, as is typical of present day computers, but remains resident in the memory on which it has been prerecorded. The resulting system is lower in cost, and especially suitable for using standardized programs which can be distributed in machine compatible form at modest cost.

5 Claims, 7 Drawing Figures

STUDENT'S COMPUTER

This application is a continuation-in-part of U.S. application Ser. No. 375,455 filed July 2, 1973.

REFERENCES

The embodiments described in this disclosure employ, in part, subsystems described in the following references:
1. U.S. Pat. No. 3,755,792 issued August 28, 1973, entitled "DIGITAL DATA STORAGE SYSTEM." Issued to Norman L. Harvey.
2. INTRODUCTION TO PROGRAMMING, Digital Equipment Corp. small computer handbook series.
3. 8080 MICROCOMPUTER SYSTEM USER'S MANUAL, Intel Corporation, July, 1975.

BRIEF SUMMARY OF THE INVENTION

My invention is of an improved computer architecture particularly suitable for low cost, free standing equipment to be used in the school classroom environment. It employs storage media which can be economically mass produced with pre-recorded programs and data files, which can be essentially "plugged in" to the equipment, and which function as the primary operating memory component without the necessity of program transfer to internal core.

Although many schools are already using computers in the educational process, there is a great need for equipment having the features described in this disclosure. Present equipment is so costly that it is a rare school that can afford more than 6 or 8 terminals, and it is usually necessary to concentrate these terminals in a computer room to which students come, rather than taking the terminals into the classroom itself. Present systems further require a level of training on the part of the general classroom teacher that most are unwilling or feel unable to absorb.

My invention overcomes these limitations of existing systems, achieving substantially lower cost and greatly increased teacher convenience by employing as the primary operating memory of the computer a low cost, mass producible, storage medium on which programs and data are pre-recorded, and which can be easily plugged in to the computer. The normal core memory, as a result, can be very small since it is needed only to receive operator-entered data, to store the intermediate results of calculations, and to store certain program subroutines.

In a preferred embodiment of my invention, a vinyl phonograph disk is used as this storage medium. Phonograph disks can be replicated in large volume by conventional record pressing techniques, can be distributed at costs approximating those for printed materials, and are easily "plugged in" to the equipment. An efficient method of recording digital data on phonograph disks, and of recovering it, is described in my U.S. Pat. No. 3,755,792. The use of a magnetic tape cassette also is described.

The customary input/output devices can be employed, but the phonograph disk and the tape cassette both permit the use of prerecorded voice messages as a novel and economical feature. Means to utilize this capability is disclosed.

BRIEF DESCRIPTION OF THE DRAWINGS

The invention will become more apparent by reference to the following drawings which show certain preferred embodiments of the invention.

DETAILED DESCRIPTION

Figure 1:
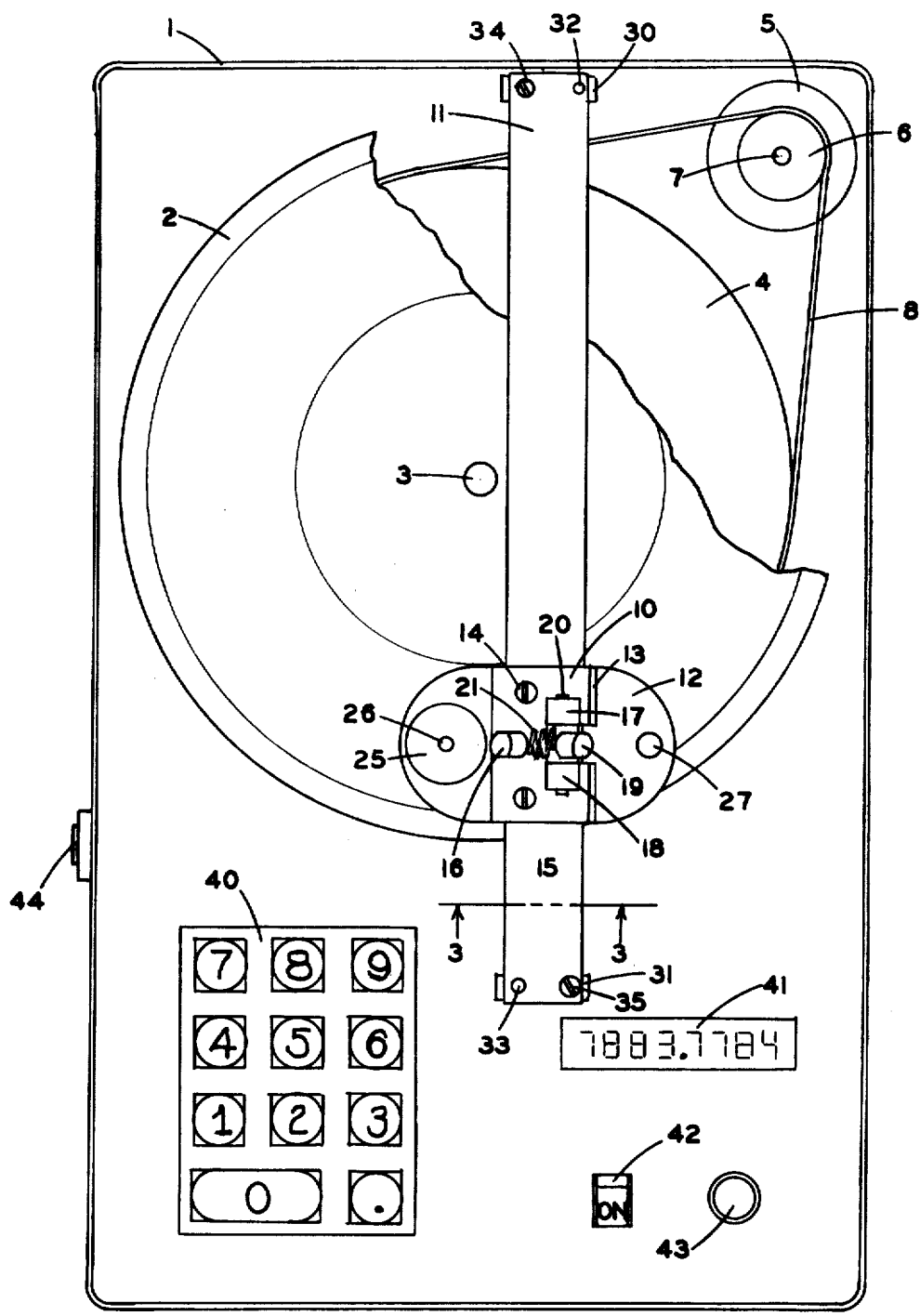
FIG. 1 is a general assembly view of an embodiment employing a phonograph-type disk as the plug-in memory component, a simple decimal keyboard entry device, and a small visual display and audio headphone output means.

Referring first to FIG. 1, the computer, employing a phonograph-type disk in this preferred embodiment, is shown assembled in a case 1. Disk 2 is centered over post 3 on a turntable 4 which rotates typically at 45 rpm, although other rotation speeds may be used if advantageous to certain applications. A small motor 5 with a pulley 6 secured to its shaft 7 drives the turntable 4 by means of a belt 8.

A rail 11 bridges across the top of the turntable and disk, and serves as a support and track for a cartridge carriage assembly which can be moved along it to selected radial positions over the grooves of disk 2. Rail 11 is supported at either end by rail blocks 30 and 31, to which it is precisely located by taper pins 32 and 33, and fastened with cap screws 34 and 35.

The carriage assembly consists of plate 12 to which is fastened rail guide 13 by means of machine screws not visible in this figure. Firmly fixed to rail guide 13 by machine screws 14 and 15 is a lever base 10 which carries a fixed lever 16, and blocks 17 and 18 between which carriage release lever 19 can turn about a small shaft 20. A compression spring 21 holds the levers 16 and 19 normally apart. The teacher or student can free the cartridge assembly to move along rail 11 simply by pinching together levers 16 and 19.

Mounted also on plate 12 of the carriage assembly is cup solenoid 25 with its armature 26, and pivot 27, about which the cartridge arm assembly, underneath and not visible in this plan view, can turn.

The teacher (or student) prepares to use the computer by selecting a disk carrying the pre-recorded program he desires, and placing it on the turntable. He next pinches together levers 16 and 19, and moves the cartridge assembly along the rail to position the stylus over the lead-in groove to the particular program he wants to use. When the levers are released, a knife edge on the lower part of lever 19 engages serrations 94 in rail 11 (see FIG. 5) and locks the assembly in place.

In this embodiment the student enters coded commands and numbers into the computer by means of a ten digit keyboard 40. Computer output is by means of a numeric display 41, and aurally by headphones plugged into phone jack 44.

The computer is turned on by line switch 42, and the "ON" condition is indicated by pilot light 43.

Figure 2:
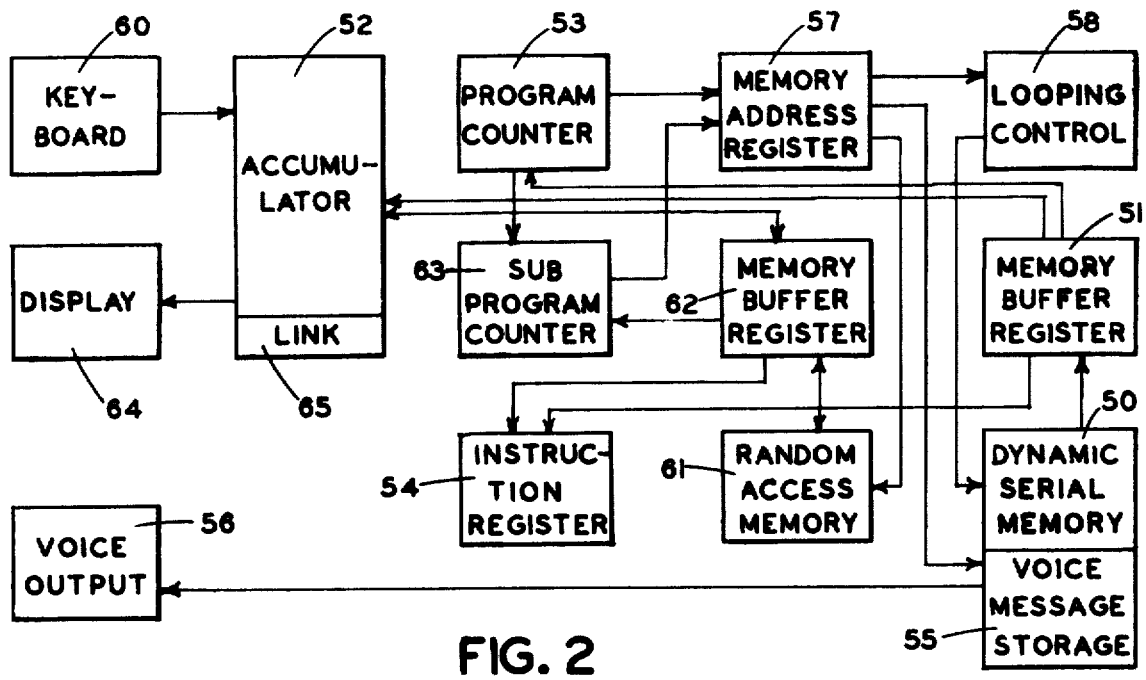
FIG. 2 is a functional block schematic showing the elements of my invention integrated into a typical minicomputer.

FIG. 2 is presented to show the altered functional relationships among the elements of a typical mini-computer system when the plug-in memory is introduced into the system. It is intended more to show the functional relationships within the processor, than as a functional design of the improved system.

To one skilled in the art, most of the component parts of the block schematic of FIG. 2 will be recognized as a typical mini-computer. (e.g. see FIG. 2-1, page 2-5 of Introduction to Programming, Digital Equipment Corporation). Input is made to the computer by conventional keyboard 60 with the binary coded key-strokes accumulated in accumulator 52. Any carries out of the accumulator in the course of the performance of arithmetic operations, set link 65. Computer output is to display 64 from accumulator 52 in a well known manner.

Transfers of data and instructions, both input and output, between accumulator 52 and random access memory 61 are routed through a memory buffer register 62. Instructions from the program software are moved from random access memory 61, through memory buffer register 62, to instruction register 54 from which they direct the selection of the hard-wired instructions from the instruction set of the system. With the execution of each instruction, sub-program counter 63 is supplied with the address of the next instruction to be executed. Memory addresses referenced by an instruction are held in memory address register 57.

The inter-functioning of all these elements of FIG. 2 just described, is entirely in a well known and conventional manner when used in conjunction with the additional components comprising the system of my invention, and is fully described in any book on mini-computer architecture. To this conventional system, I have added certain additional components in a novel manner, and these will be described more fully in connection with FIGS. 2, 6, and 7.

The crucial addition, continuing with FIG. 2, is dynamic serial memory 50. In a first preferred embodiment of my invention, dynamic serial memory 50 is a phonograph-type disk encoded with software and data in digital form. In an alternative embodiment of my invention, magnetic tape is employed as the dynamic serial memory. The word "dynamic" is used here to describe the fact that these two alternative storage media are in motion as used in my computer system.

In the preferred embodiment employing the phonograph-type disk, a number of appropriate computer programs useful to the classroom are encoded in the spiral groove of the disk in machine language form. Any one of several known techniques for recording digital data on a phonograph disk may be employed, but the method described in my U.S. Pat. No. 3,755,455 is especially efficient and suitable. Using that method, data can be stored readily at densities of 2000 bits per linear groove inch. The innermost groove may have, typically, a diameter of 3½ inches, or about 11 inches of groove length for one revolution. The storage capacity of this groove is then 11 × 2000 bits, or 22,000 bits total. If the computer is designed to use an 8 bit word, this groove provides a capacity of about 2750 such 8 bit words. The other grooves, in a system employing a constant speed turntable, can store the same amount of software at lower density.

If magnetic tape is used for dynamic serial memory 50, the programs and data can be stored in the same complementary pair of tracks as described in my previously referenced patent, in the self clocking Manchester code, or in other suitable form. The tape is most conveniently handled if it is used in cassette form. A conservative recording density of 1000 bits per inch, will require 22 inches of tape to provide the same storage capacity as available in one turn of the disk as described above.

In the conceptual schematic of FIG. 2, the data is recovered from the disk as described in my U.S. Pat. No. 3,755,455 as a serial data stream. Then 8 bit groups are assembled in a second memory buffer register 51. From there data is separated out and routed to accumulator 52, and thence either to display 64, or through memory buffer register 62 to random access memory 61. Most importantly, however, a series of program instructions increment program counter 53 and are transferred to instruction register 54 for execution. The tempo and the sequence of processing steps executed by the computer system is established by the 8-bit words being output by the dynamic serial memory 50, and not by any program stored in the random access memory 54. Unlike existing systems where programs are transferred from external storage devices, like magnetic tape cassettes, into an internal random access memory, and then executed by progressively stepping through the internally stored program, the system of my invention retains the mass storage device as the operating source of the program being executed. The internal random access memory is used only as a "scratch pad," or to hold relatively short subroutines.

Since the program is stored and output in sequential form, any program which requires looping back to an earlier portion of the program employs looping control 58. In that case an earlier address would be transferred from program counter 53 to memory address register 57, identified as requiring looping by instruction register 54, and activate looping control 58. Cup solenoid 25 is de-energized, Hook 82 (See FIG. 3) raises arm 76 with cartridge 72, and disengages stylus 73 from the groove. By means to be described in detail in the discussion of FIGS. 3 and 4, the stylus is repositioned to the portion of the groove in which the start of this particular program resides.

Retaining program control in a storage medium such as a tape cassette or a phonograph disk, makes it feasable to store audio messages integral with the program. This is shown as a voice message storage 55 in FIG. 2, actually an integral part of dynamic serial memory 50. The voice is recorded on tape or disk in a conventional manner. Under program control, these messages are output through voice output 56, which for a classroom could be an amplifier and either speaker or headphones.

Figure 6:
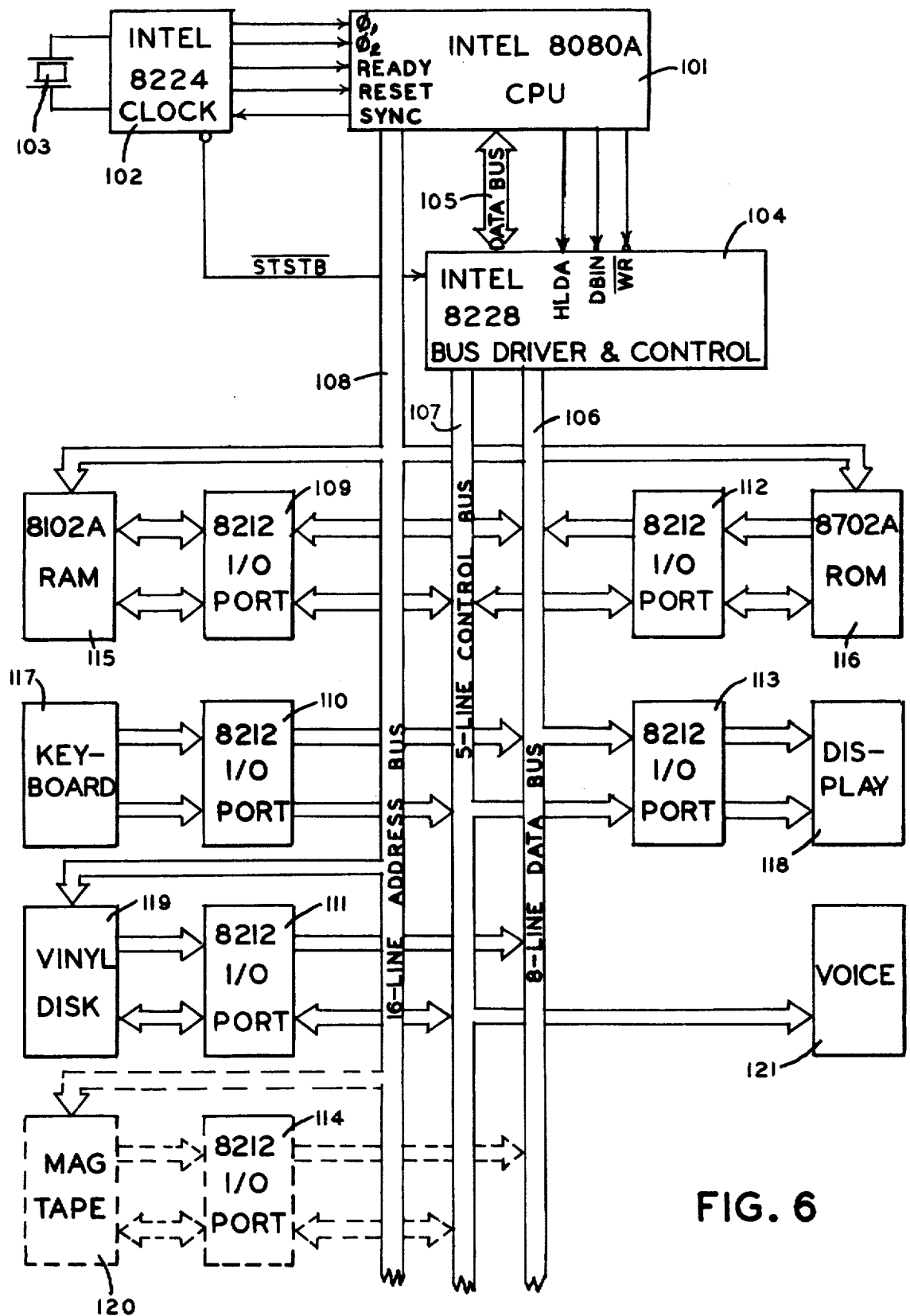
FIG. 6 is a block schematic of the complete system implemented with standard components of the Intel Corporation microprocessor line.

FIG. 6 shows an embodiment of a system utilizing my invention in further detail as implemented using the micro-processor and related chip components manufactured by Intel Corporation. Complete detail of the interconnection of the Intel components among themselves, and between them and standard I/O devices, is provided in their "8080 Microcomputer Systems User's Manual," July 1975. The full detail of the interconnection to the nonconventional components required to utilize my invention, is provided in connection with FIG. 7.

Referring now to FIG. 6, the Intel 8080A Central Processing Unit, with it's 47 instruction set is shown as 101. An Intel 8224 Clock 102, controlled by crystal 103, provides 2-phase clock signals to CPU 101. Ready, Reset, and Sync connections are provided between the units as described in the User's Manual. An Intel 8228 bi-directional Bus Driver and Control 104 interfaces CPU 101 to an 8-line data bus 106, and to a 5-line control bus 107. Data can flow in either direction between the 8080A CPU and the 8228 Bus Driver through data bus 105. A request from any peripheral device that the CPU 101 enter a "hold" state is acknowledged on the HLDA line. The DBIN line carries a signal to peripheral devices through the control bus that the data bus is in the input mode, and a signal on the WR line indicates an ouput write to a peripheral. An STSTB (strobe) input from Clock 102 strobes instruction status information onto the data bus at the beginning of each instruction cycle.

Intel 8212 I/O Ports 109 through 114 are shown interfacing several I/O devices to control bus 107 and data bus 106. An address bus 108 connects directly from CPU 101 to the several 8212 Ports. The address bus carries I/O device addresses and device identification information. An Intel 8102A random access memory 115 is connected to Port 109 to serve as a scratch pad memory, including the storing of short program subroutines. The Port 115 provides an 8-bit latch and output buffering. A read-only memory chip, the Intel 8702A 116 is interfaced to the system through Port 112 to provide a storage for standard utility software, such as a keyboard monitor.

Keyboard 117 is conventional, as is its connection to the system through Port 110. The keyboard can be the simple 10-digit keyboard 40 shown in FIG. 1, or a standard teletype keyboard. Display 118 is the conventional set of drivers and light emitting diodes, and is connected to the system through Port 113 in a manner well known to those skilled in the art.

A vinyl disk 119, connected through Port 111, is the source of program and data to be executed and utilized by the system. A magnetic tape unit 120 is shown in dashed lines as an alternate source of program and data. Optional magnetic tape 120 is interfaced to the system through Port 114. A voice output unit, 121, comprising an audio amplifier and headset, is actuated under program control through control bus 107.

Figure 7:
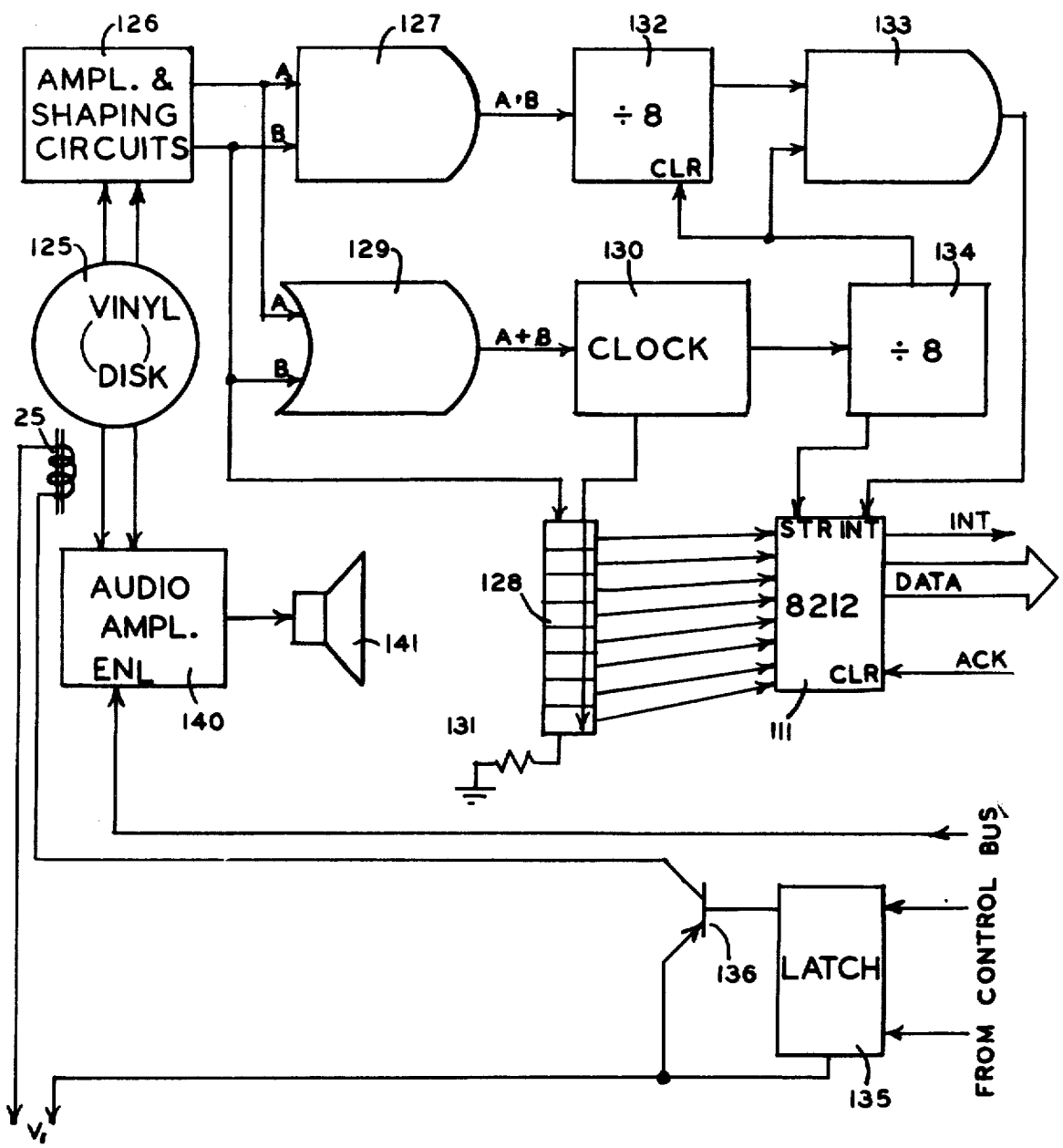
FIG. 7 shows the detailed circuit interfacing the phonograph disk memory system and the voice message system to the microprocessor.

In FIG. 7 the details of the interconnection of those portions of the system wherein the novelty lies, are shown. Vinyl disk 125, in this embodiment, is considered to be encoded with non return to zero--change at one (NRZ1) signals in one track of a stereo pair, and with the complementary non return to zero--change at zero (NRZO) signal in the other, as described in detail in my U.S. Pat. No. 3,755,455. As further described in that patent, each of the two signals is recovered independently with a stereo cartridge, amplified and shaped in separate channels, and output as a compleementary pair of pulse trains. Amplifier & shaping circuits 126 perform these functions according to the teaching of that patent.

The signals encoded on vinyl disk 125 are encoded as a sequential stream of 1's and 0's, each group of 8 representing one data word. In the complementary channel, 1's replace 0's, and 0's replace the 1's. In FIG. 7, the B channel is shown as the direct channel, and the A channel as the complementary one. In order to distinguish whether each data word output from the disk is an instruction, data, or an address, some form of coding is necessary. One efficient method, available because of the existence of a complementary pair, is to break the complementary relationship for one 8-bit data word as a synchronizing signal. The particular arrangement depicted in FIG. 7 is based upon encoding 1's in both channels for one full 8-bit word to indicate that the next 8-bit word will be an address, and that all succeeding words are to be assumed to be either data or instructions located in an ascending sequence of addresses. In other words, any full sequence of 8-bits in both channels is a synchronizing signal only. The next 8-bit word is an address, and each following 8-bit word is to be considered as located in memory at an address incremented by one over the next previous address. This continues until the next synchronizing word is output.

Turning again to FIG. 7, the train of pulses output on the B channel from amplifier and shaping circuits 126 branches into three paths. The lower one of the three paths in the schematic leads to an 8-bit serial register 128 where the 8-bit data words are assembled. Register 128 is also connected in parallel to the eight latches of the Intel 8212 I/O port 111. The latches are set when port 111 is strobed at the STR connection.

Asecond branch of the B-channel output from amplifier and shaping circuits 126 leads to Inclusive OR gate 129. One branch of the A channel also leads to OR gate 129, and the gate output, which is an unbroken stream of 1's, is used to synchronize clock 130 at the bit rate output from the disk. One output from clock 130 is used to sequence serial register 128. As bits are sequenced out of the high end of the register, they are dissipated in the resistor load 131.

The A and B channels are ANDed in gate 127, the output of which is divided by 8 in divider 132. A second output from clock 130 is divided by 8 in a second divider 134. One output from this divider provides the strobe signal to I/O port 111, a second clears divider 132, and a third is input to AND gate 133, along with an output from divider 132. An output from gate 133 is lead to the interrupt (INT) terminal of I/O port 111, and transmitted to the CPU 101 over the control bus. The completion of the transfer of a data word from I/O port 111 to CPU 101 is acknowledged with a clear (CLR) signal back to the I/O port which clears the latches.

The first word in each program on vinyl disk 126 is a synchronizing word, i.e. 8 successive bits in both A and B channels. Clock 130, and dividers 132 and 134 will all be initialized simultaneously, and at the eighth bit, there will be a bit appearing simultaneously on both input ports of AND gate 133. These will AND to produce an interrupt to the CPU 101, a clear signal will be returned to I/O port 111, the latches of the port will be cleared, and the system is ready to receive the first address word. This normally will be the address of initialization of the program counter in CPU 101, and the ensuing words will be instructions.

CPU 101 increments its program counter after executing each instruction, and sends out an address on the address bus with a request for the information stored at that location. The vinyl disk outputs a data word that is at an address defined as being the next higher address, and the computing process proceeds. If data is to be transferred, a synch signal is output, a new address sequence is started at a memory location assigned to data, and data is transferred and processed under program control. At the conclusion of data transfer, another synch word can initiate a return to addresses assigned to instructions. The ROM 116 can be accessed for general service routines in a conventional manner, and the RAM 115 can be used dynamically as a scratch pad for short special routines and for holding processing results.

Small loops can be read from vinyl disk system into the RAM and executed as subroutines. A major loop can be identified in the stored program as a previously used address, initiating a hold request to the CPU, and activating via the control bus an initiating signal to latch 135, thus initiating switching action by transistor 136 to solenoid 25. The stylus is raised and mechanically repositioned to the starting groove, lowered, the system is re-initialized for synchronization, and a search is instituted for the desired address, all under software control.

Vinyl disk 125 also can be encoded with audio messages, recorded either monaurally or in stereo by normal recording techniques, and interspersed with the digital data on the disk. These messages would be brief program responses or promptings to the student, requiring a playing time of the order of one second. Each response is preceeded by a synch signal and a unique address. In program execution, an instruction will call for an input from that memory address, a service routine stored in ROM 116 will identify that address as a disk audio location, a control signal will be transmitted via the control bus to enable (ENL) audio amplifier 140. The same cartridge and stylus associated with disk 125 which recovers the stored digital data, also recovers the audio message which is input by a second circuit connection to audio amplifier 140. The amplifier output actuates a small loudspeaker 141. It is obvious that headphones can be substituted for the loud speaker. At the conclusion of the voice message, another synch signal initiates an interrupt to CPU 101 as was previously.

It is well known that magnetic tape and phonograph disks have comparable capabilities of frequency range, signal to noise ratio, and general recording fidelity in the recording of sound, and both media are used extensively commercially for this purpose. Moreover, the use of magnetic tape for the storage of digital data is extensive and well known. It will accordingly be obvious to those skilled in the art, that a magnetic tape cassette could readily be substituted for vinyl disk 125 in a second alternative embodiment of my invention. Digital data, in direct and complementary form can be recorded on two tracks of such a magnetic tape storage component, and these two outputs can be input to amplifier and shaping circuits 126 in exactly the same manner as has been described for signals from the vinyl desk. Other encoding means can be used for the magnetic tape, suchas single track with the so-called Manchester code, by making modifications to the circuits for other patterns of timing and sychronizing signals. Such modifications will be readily made by those skilled in the art.

Looping requirements in using a magnetic tape cassette are met by using transistor switch 136 to activate a rewind to a beginning-of-file mark encoded on the tape. This rewind operation replaces sequence of lifting and repositioning the stylus when using the phonograph-type disk.

Figure 3:
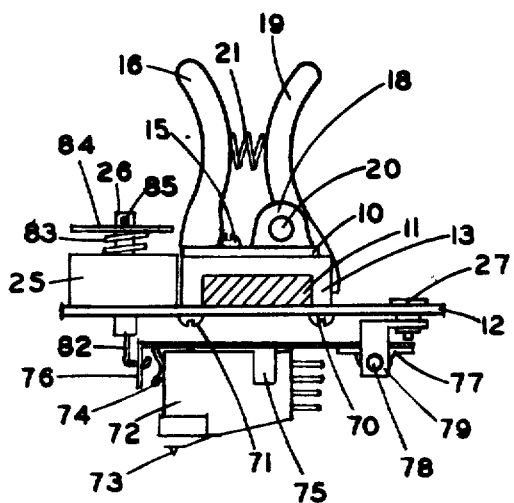
FIG. 3 is a side elevation, sectioned along lines 3—3 of FIG. 1, showing the cartridge carriage assembly.

FIG. 3 shows, in a view sectioned along lin 3—3 of FIG. 1, details of the cartridge carriage assembly, . . It is this assembly that the student moves along rail 11 as he selects the particular program he wants to use. The parts of the carriage assembly are mounted mostly on plate 12. Rail guide 13, machined to provide a smooth sliding fit to rail 11, is fastened to plate 12 by small machine screws 70 and 71. Fastened, in turn, to rail guide 13 by means of screws 14 and 15 (only 15 is visible in this figure), is lever base 10, to which fixed lever 16 is firmly attached. Carriage release lever 19 rotates about shaft 20, which is supported between a pair of blocks, of which one, 18, is visible in FIG. 3. Compression spring 21 holds the two levers 16 and 19 apart.

Cartridge 72 with its stylus 73 is held in cartridge arm 76 by spring clips 74 and 75. Arm 76 is fastened to a small bearing block 77 which pivots around pin 78, which is held in yoke 79. This pivoting arrangement permits the cartridge 72 to move in a vertical arc. Yoke 79, in turn, can turn about the vertical axis provided by shoulder pin 27 which is mounted in plate 12. Arm 76 is unusually short as compared to typical phonograph tone arms. This short arm is practical because the maximum travel of stylus 73 along the disk radius during program execution is only a few grooves of the spiral, spanning perhaps 1/32 inch. The angular travel is thus an order of magnitude less than that required in normal audio record players, and approaches much more closely the ideal of having no lateral component in the tracking force.

The stylus is raised by hook 82 which engages a triangular opening in cartridge arm 76. The triangular opening has its apex at the top, and is wide enough in the lower portion so that when stylus 73 has been lowered into the groove, it can move laterally through at least the full 1/32 inch allocated to one program without hook 82 coming into contact with the sides of the triangular opening. When hook 82 is raised so as to lift the stylus clear of the disk groove, it then comes into contact with both sides of the triangular opening as it nears the apex, and so returns the cartridge arm 76 and stylus 73 to the position that the student had set initially. This operation occurs every time looping control 58 of FIG. 2 is activated in introducing a pause in program execution of student response, or for looping back to earlier portions of the program on the disk.

Hook 82 is an integral part of armature 26 of cup solenoid 25. In the de-energized condition of solenoid 25, the armature 26 is held in a raised position by compression spring 83, pushing against iron washer 84, which is held onto armature 26 by locking pin 85. The normally raised position of stylus 73 is a safeguard against stylus of disk damage when the computer is being moved.

Figure 4:
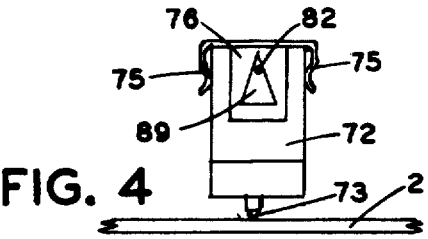
FIG. 4 is a front elevation of the cartridge and its holder showing means for lifting the stylus from the disk.

FIG. 4 is a front end view of the cartridge and its lifting means, intended to further clarify the arrangement of the triangular opening. Cartridge 72 is shown with stylus 73 just leaving engagement with a groove on disk 2. Cartridge 72 is held to cartridge arm 76 by spring clips 75. The triangular opening 89 in the forward portion of arm 72 is shown, with a section view of hook 82 engaged at the apex of the triangular opening.

Figure 5:
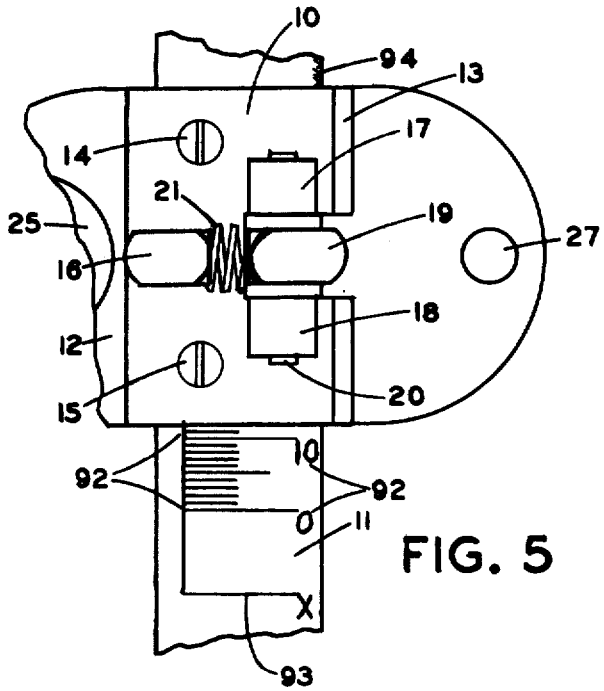
FIG. 5 is an enlarged plan view illustrating the arrangement for locking the carriage at a selected position to engage the grooves carrying a particular stored program.

FIG. 5 shows the manner in which the cartridge carriage assembly is locked to a selected program position by a knife edge in the lower portion of release lever 19 engaging accurately milled serrations 94 in rail 11. In this illustrative embodiment, serrations 94 are 1/32 inches center-to-center, and are positioned to register with the mid-point of a lead-in spiral groove for each recorded program on the disk. A set of calibration marks 92 is engraved on rail 11, and are also in registry with corresponding serrations 94, so that one edge of plate 12 serves as an index for reading the particular program setting of the carriage assembly. In FIG. 5 the carriage is shown positioned at Program #12. A position "X" is shown at 93 that is used to position the carriage out of the way when replacing a disk on the turntable. Other parts in the Figure are as identified and explained in connection with the explanation of previous figures in this specification.

It will be apparent that other input and output devices can be used in systems utilizing my invention. For example, a standard alpha-numeric keyboard can be used in place of the simple ten-digit keyboard. Output also can be made to an alpha-numeric LED display, to electric typewriter, to graphical platting devices, or to a cathode ray tube.

It will be understood that many of the specific means described for the preferred embodiments disclosed in this specification, may be replaced or modified, and still will be within the scope of my invention.

What is claimed is:

1. A data processing apparatus, comprising:

a plastic disk on at least one face of which a sequentially organized combination of synchronization signals, processor instructions, and related data has been stored as undulations in aspiral groove;

transducer means for transforming the undulations into an electrical signal having a corresponding pattern of pulses;

detection means for identifying certain pulse patterns as said synchronization signals, each occurrence of which representing a predetermined reference point in the organized sequence of said instructions and data;

clocking means synchronized to said pattern of pulses;

serial register means responsive to said clocking means and said detection means for assembling subsequent portions of said pattern of pulses into binary words;

decoding means for identifying which portions of said pulse patterns represent addresses, processor instructions, digital data, or data in other forms;

data processor means for performing data processing operations;

first interfacing means responsive to said decoding means for selectively transferring each assembled binary word which represents a processor instruction from said serial register means to said data processor means;

second interfacing means responsive to said decoding means and said processor means for selectively transferring each subsequently assembled binary word, representing the data related to said transferred instruction, from said serial register means to said data processor means;

said data processor means performing the operations indicated by each said instruction upon its related data immediately upon completion of the respective transfers by said first and second interfacing means; and output means for reporting the results of the operations performed on said transferred data.

2. The data processing apparatus of claim 1 wherein means are included to disengage said sensing means from the spiral groove, return it to a preceeding portion of said groove, and to reengage it in the groove so as to recycle through a portion of the stored data and processor instructions.

3. The apparatus of claim 1 wherein said plastic disk is a phonograph type disk encoded with data and processor instructions.

4. The apparatus of claim 1 wherein said plastic disk stores both voice messages and data encoded in digital form.

5. The apparatus of claim 1 wherein said plastic disk is readily replacable by the user with a similar disk on which a second series of data and processor instructions has been stored.

* * * * *